(12) United States Patent
Wilcock et al.

(10) Patent No.: US 7,454,090 B2
(45) Date of Patent: Nov. 18, 2008

(54) AUGMENTATION OF SETS OF IMAGE RECORDINGS

(75) Inventors: Lawrence Wilcock, Wiltshire (GB); Michael P. Spratt, Bristol (GB); Andrew Thomas, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1307 days.

(21) Appl. No.: 09/788,422

(22) Filed: Feb. 21, 2001

(65) Prior Publication Data

US 2001/0017668 A1    Aug. 30, 2001

(30) Foreign Application Priority Data

Feb. 21, 2000 (GB) ................... 0004067.5
Mar. 20, 2000 (GB) ................... 0006594.6

(51) Int. Cl.
*G06K 9/60* (2006.01)
(52) U.S. Cl. ...................... 382/305; 382/306
(58) Field of Classification Search ............. None
See application file for complete search history.

(56) References Cited

U.S. PATENT DOCUMENTS

| | | | | |
|---|---|---|---|---|
| 5,296,884 A | 3/1994 | Honda et al. | ................ | 354/106 |
| 5,335,072 A | 8/1994 | Tanaka et al. | ................ | 238/232 |
| 5,389,934 A | 2/1995 | Kass | ................ | 342/357 |
| 5,488,558 A | 1/1996 | Ohki | ................ | 364/449 |
| 5,506,644 A | 4/1996 | Suzuki | ................ | 354/106 |
| 5,519,046 A * | 5/1996 | Noda et al. | ................ | 514/413 |
| 5,535,063 A | 7/1996 | Lamming | ................ | 360/4 |
| 5,606,627 A * | 2/1997 | Kuo | ................ | 382/154 |
| 5,675,377 A * | 10/1997 | Gibas | ................ | 347/47 |
| 5,712,679 A | 1/1998 | Coles | ................ | 348/158 |
| 5,806,072 A * | 9/1998 | Kuba et al. | ................ | 707/200 |
| 5,898,434 A | 4/1999 | Small et al. | ................ | 345/348 |
| 5,926,116 A | 7/1999 | Kitano | ................ | 340/988 |
| 5,995,936 A * | 11/1999 | Brais et al. | ................ | 704/275 |
| 6,023,241 A | 2/2000 | Clapper | ................ | 342/357.13 |
| 6,272,235 B1 * | 8/2001 | Bacus et al. | ................ | 382/133 |

(Continued)

FOREIGN PATENT DOCUMENTS

EP     0 833 494 A2     4/1998

(Continued)

OTHER PUBLICATIONS

IBM Camera disclosure, Digital Camera with Global Positioning Satellite to Record Location with Imag, p.1, see http://w3.hpl.hp.com/legal/innov/loceserv/priorart/ibmrdcam.htm, Jan. 23, 2001.

(Continued)

*Primary Examiner*—Brian Q Le
(74) *Attorney, Agent, or Firm*—Ohlandt, Greeley, Ruggiero & Perle, L.L.P.

(57) ABSTRACT

A method is provided for augmenting a set of image recordings in which, in addition to making image recordings (95), location data (175) is recorded for locations for which the user desires an, or a further, image recording. This desired-image-recording location data is subsequently used to retrieve one or more corresponding image recordings from a service system (40).

11 Claims, 12 Drawing Sheets

U.S. PATENT DOCUMENTS

| | | | |
|---|---|---|---|
| 6,313,835 B1 * | 11/2001 | Gever et al. | 345/846 |
| 6,320,593 B1 * | 11/2001 | Sobel et al. | 345/600 |
| 6,424,385 B1 * | 7/2002 | Koyama et al. | 348/734 |

FOREIGN PATENT DOCUMENTS

| | | |
|---|---|---|
| EP | 0 920 179 A2 | 6/1999 |
| EP | 0 959 418 A2 | 11/1999 |
| EP | 0959418 A2 | 11/1999 |
| GB | 2249202 A | 4/1992 |
| JP | 4070729 | 3/1992 |
| JP | 4070729 A | 3/1992 |
| JP | 6194738 A | 7/1994 |
| JP | 8240854 | 9/1996 |
| JP | 8335034 A | 12/1996 |
| JP | 9116657 | 5/1997 |
| JP | 9163203 A | 6/1997 |
| JP | 9200666 A | 7/1997 |
| JP | 10023398 | 1/1998 |
| JP | 10073879 | 3/1998 |
| JP | 08304553 | 5/1998 |
| JP | 10181241 A | 7/1998 |
| JP | 10233985 A | 9/1998 |
| JP | 10319494 A | 12/1998 |
| JP | 11015065 A | 1/1999 |
| JP | 11112918 | 4/1999 |
| JP | 11164282 | 6/1999 |
| JP | 11259502 A | 9/1999 |
| JP | 11266430 | 9/1999 |
| JP | 200057320 | 2/2000 |
| WO | WO 97/18440 | 5/1997 |
| WO | WO 98/10246 | 3/1998 |
| WO | WO 99/48276 | 9/1999 |
| WO | WO 00/01138 | 1/2000 |
| WO | WO 00/24131 | 4/2000 |

OTHER PUBLICATIONS

Search Report under Section 17 for Application No. GB0006594.6, Oct. 30, 2000.

* cited by examiner

AUGMENTATION OF SETS OF IMAGE RECORDINGS

FIELD OF THE INVENTION

The present invention relates to augmenting sets of image recordings. As used herein, image recordings includes single photographs, sequences of photographs, and video recordings, all whether chemical or digital.

BACKGROUND OF THE INVENTION

Classification of photographs, particularly those taken by individuals and families, has long been a problem due to the effort involved in maintaining any organisation of the photos. What is needed is a logical organisation, valid over a lifetime, that requires minimal effort to implement and is intuitive to use when retrieving photos.

It has been previously proposed to associate location (and orientation) data with digital photos. The location data can be derived in any suitable manner such as from a GPS system or by using information obtained from a cellular radio system. Thus, IBM Technical Disclosure 413126 teaches a digital camera provided with a GPS receiver. U.S. Pat. No. 5,712,679 discloses a locatable portable electronic camera which is arranged to send back image and location data when triggered, the location data being displayed on a map and the image being shown separately. Also of interest is U.S. Pat. No. 5,389,934 which describes a portable locating system with a GPS unit that is operative to store a travel history of locations visited.

Other proposals go further and disclose the management digital photographs by using an electronic map to show a thumbnail of each photograph at a corresponding position of the electronic map. FIG. 1 of the accompanying drawings illustrates the main elements for implementing such an system, these element being a digital camera 3 equipped with a GPS receiver for determining camera location using signals from satellites 2, a PC 5 for receiving digital photographs 4 downloaded from the camera 3 together with GPS-derived location information about where each photograph was taken, an album program 6 for managing the downloaded photographs, a store 7 for storing the digital photographs (plus location information), and a store 8 for storing map data (the stores 7 and 8 will generally be internal to the PC 5 but may by external). Such an arrangement is described, for example, in JP 10233985A.

The combination of location-tagged digital photographs with map-based digital photograph albums should greatly facilitate the management of photographs for the ordinary user. However, it is important that the photograph management systems provided with the map-based electronic albums are also flexible and easy to use. In this respect the above-mentioned JP 10233985A describes the possibility of the user classifying each photograph whilst JP 8335034A discloses the use of an icon to represent groups of photographs on a map display.

It is an object of one aspect of the present invention to further facilitate the photographic experience by enabling a user to complete a set of photographs (and other image recordings).

Certain arrangements described hereinafter utilize data bearer services and location services of cellular radio networks. Such networks are widespread though the afore-mentioned services are only now being taken up significantly. To facilitate an understanding of the following description, a brief review of cellular network technology and how the foregoing services can be implemented is given in the Annex appearing at the end of this description, reference being had to FIG. 2 of the accompanying drawing that depicts a mobile location-aware service being provided to a mobile entity 20 via a Public Land Mobile Network (PLMN) 10.

SUMMARY OF THE INVENTION

According to the present invention, there is provided a method of augmenting a set of image recordings, wherein a set of image recordings are taken and corresponding taken-image-recording location data is recorded to indicate the locations where the image recordings were taken; and wherein desired-image-recording location data is also recorded to indicate at least one location for which the user desires an, or a further, image recording; the desired-image-recording location data being subsequently used to retrieve one or more corresponding image recordings.

Other aspects of the invention are set forth in the accompanying claims

BRIEF DESCRIPTION OF THE DRAWINGS

Embodiments of the present invention will now be described, by way of non-limiting example, with reference to the accompanying diagrammatic drawings, in which.

BEST MODE OF CARRYING OUT THE INVENTION

Figure 3:
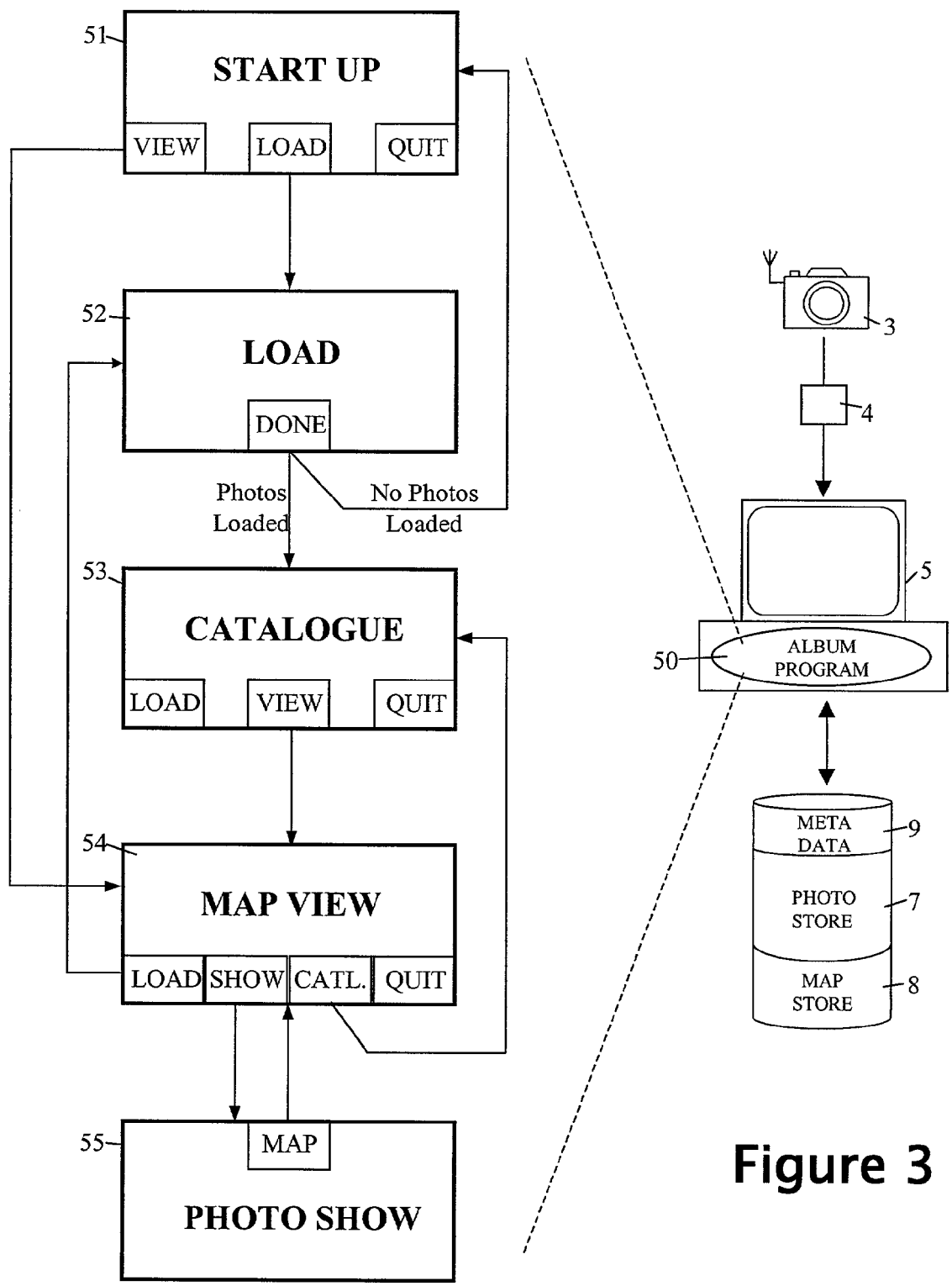
FIG. 3 is a diagram of an electronic photographic album system showing the five operating modes of an album program.

FIG. 3 depicts a photo system in which a digital camera 3 provided with location determining means (such as a GPS receiver) is used to generate digital photos 4, each photo (also referred to as 'image data') 4 being stamped with location data indicating where the photo was taken. Other data may also be associated with each photo, such as a timestamp, a camera ID, and a user ID; such associated data (including the location data) is herein referred to as photo meta data. The photos and their meta data are downloaded by any suitable means (USB connection, removable storage device, etc) into a PC 5 where an album program 50 serves to store the photos in a photo store 7 and the photo meta data in a meta-data database 9 (each photo and its meta data being linked by a suitable key associated with both). The album program also has access to a map store 8. The stores 7 and 8 and the meta-data database can be on the PC or external.

The album program enables users to catalogue, manage and view their photos through a map-based interface, the photos being represented on a displayed map by a marker indicating the location they were taken.

More particularly, the album program comprises five main operating modes 51 to 55 and a user can move between these modes or quit the program by making an appropriate choice (for example, by soft keys displayed on the PC display). FIG. 3 indicates for each mode the main choices available to the user (for example, the label "View" in Start Up Mode block 51 indicates that the user can choose to change to the View Map Mode 54. The role of each operating mode is as follows:

Start Up Mode 51—This is the initial mode upon start up of the album program and it permits a user to select either the Load Mode or the Map View Mode, or to quit the program.

Load Mode 52—In this mode, the user can download data from camera 3; when the user has finished, he/she indicates this (see the "Done" label) and the mode changes either to the Catalogue Mode 53 if any photos have been loaded, or back to the Start Up Mode 51 if no photos were loaded.

Catalogue Mode 53—In this mode, the user can manage newly loaded photos using a map based display, this management including assigning them to one or more groups (sets of related photos). From this mode, the user can move back to the Load mode to load more photos or to the View Map mode for browsing the photo album; the user may also choose to quit the program.

Map View Mode—The Map View Mode 54 is the mode in which a user can browse the album and select photos for viewing. Browsing is on the basis of displaying maps with the location of photos indicated. From the Map View 54, a user can move to the Load, Photo Show, or Catalogue Modes or quit the program.

Photo Show Mode—In this mode, the user can view a photo selected in the Map View Mode; the user can also step through a series of related photos. From the Photo Show Mode, the user returns to the Map View Mode.

Figure 4:
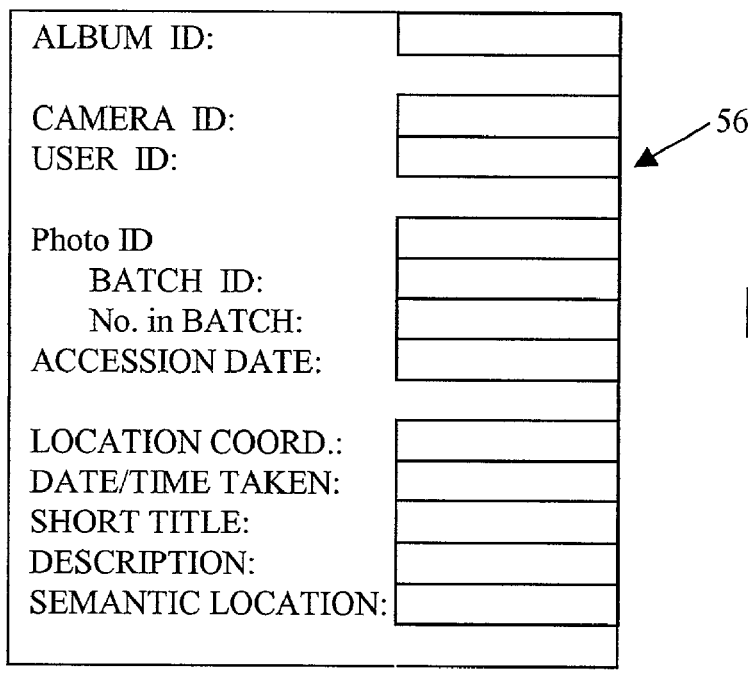
FIG. 4 shows the fields of a photo record and group record of the FIG. 3 system.

FIG. 4 shows the meta data record 56 held in database 9 for each photo, it being appreciated that some of the fields may be empty for any particular photo. The fields comprise:

Album ID—This is a unique identifier for the album.
Camera ID—This is a camera identifier that may be either supplied automatically by the camera in the photo meta data or added by the user when downloading photos.
User ID—This is a user ID which again may be either supplied automatically by the camera in the photo meta data or added by the user when downloading photos
Photo ID—This is a unique photo ID provided by the album program and can conveniently be made up of a load batch number (a new batch number being assigned for each session of downloading data from a camera) and a number-in-batch identifying the photo from others in the same batch.
Accession Date—This is the data of loading of the photo by the album program (photos in the same batch will have the same accession date).
Location Data—The location data provided with the photo by camera 3.
Date/Time Taken—The timestamp data provided with the photo by camera 3.
Short Title—A short descriptor of the photo provided by the user.
Description—A fuller user-provided description of the photo.
Semantic Loc.—A user-meaningful location description (e.g. Eiffel Tower) as opposed to the coordinates provided by the location data. This field overlaps in intent with the two preceding fields and is optional.

With respect to user ID, where this is supplied automatically by the camera, the user ID will have been set into the camera at some stage by the user. The camera can be provided with suitable means for enabling each of several users to set in their ID at every usage and/or the means for enabling several different users to set in and store their IDs with each such user selecting their ID from the stored IDs each time that user starts to use the camera; input of ID data can conveniently be done by transfer from a computer thereby avoiding the need for an input keypad associated with the camera. Alternatively, the camera can be pre-programmed with a set list of identifiers (numbers, icons, colours, animal types, etc) and users choose which identifiers to employ to distinguish amongst them; in this case, the camera simply needs to be provided with input means for enabling a user to select their identifier from the programmed list of identifiers. Thus, a camera intended for family use may have pre-programmed animal icons as identifiers with the mother and father choosing, for example, icons of a dog and cat and their three children choosing lion, tiger and rabbit icons respectively. Of course, to handle cases where icon identifiers are used, the album program is preferably adapted to store and manage user IDs of this form.

The database 9 also holds group records 57 each relating to a group of user associated photographs. Each group record comprises a group name, an indicator of a group icon to be used to represent the group, a brief description of the group, and a linked list of the IDs of photos making up the group. A photo can reside in non, one or more group.

Figure 5:
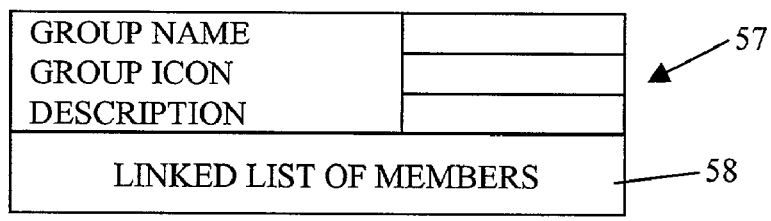
FIG. 5 shows state data items maintained by the album program of FIG. 3.
Figure 5:
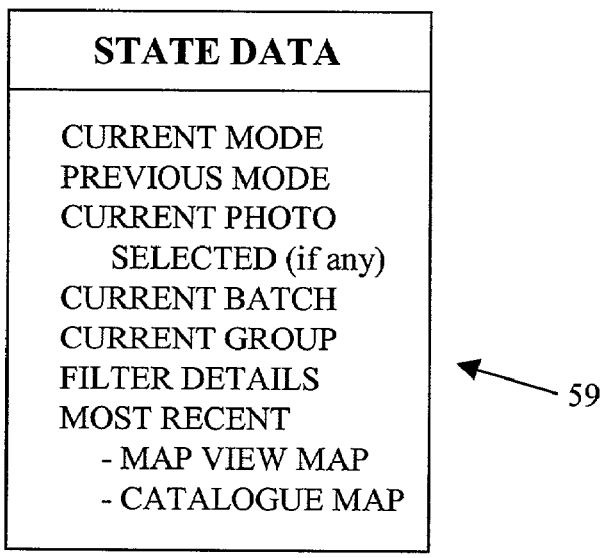

FIG. 5 shows the main state data items 59 maintained by the album program so that it knows what operational point it has reached and how to restore itself to certain prior conditions as necessary. These data items comprise:

Current Mode—The current operating mode.
Previous Mode—The previous operating mode, if any. This is required when about to enter the Map View mode from the Catalogue Mode—if the user is merely returning to the Map View Mode after having gone into the Catalogue Mode (for example, to change meta data about a photo), then the user will expect to return to the same map and display as before whereas if the user is entering the Map View Mode from the Catalogue Mode after having catalogued a newly loaded set of photos, the user will have different expectations.

Current Photo—This is the currently selected photo, if any. The selected photo may be one currently be displayed in full or merely represented by an icon or thumbnail.

Current Batch—The batch number of the current batch of photos or, where photos from more than one batch are being examined, then the batch number of any currently selected photo.

Current Group—The currently selected group, if any.

Filter Details—Details of any filter being applied to the selection of photos in the Map View and Photo Show Modes.

Most recent:

Map View map—The most recently viewed Map View Mode map (including area displayed)

Catalogue map—The most recently viewed Catalogue Mode map (including area displayed)

Other features of the album program will be described below as part of the description of a typical sequence of operation.

A user with photos to download to the album program starts the program and chooses the "Load" option presented by the Start Up Mode program code. The Load Mode interacts with the user to enable the downloading of photos and meta data from the camera 3, photo ID data (Batch and number-in-batch) and accession date being automatically added by the program to the meta data of each photo. The user may also be enabled to add in user ID data for the whole batch, over-riding any such data coming from the camera. Upon termination of loading, the user selects "Done" and the album program automatically progresses to the Catalogue Mode to enable the user to carry out cataloguing functions in relation to the newly-loaded batch of photos.

Figure 6:
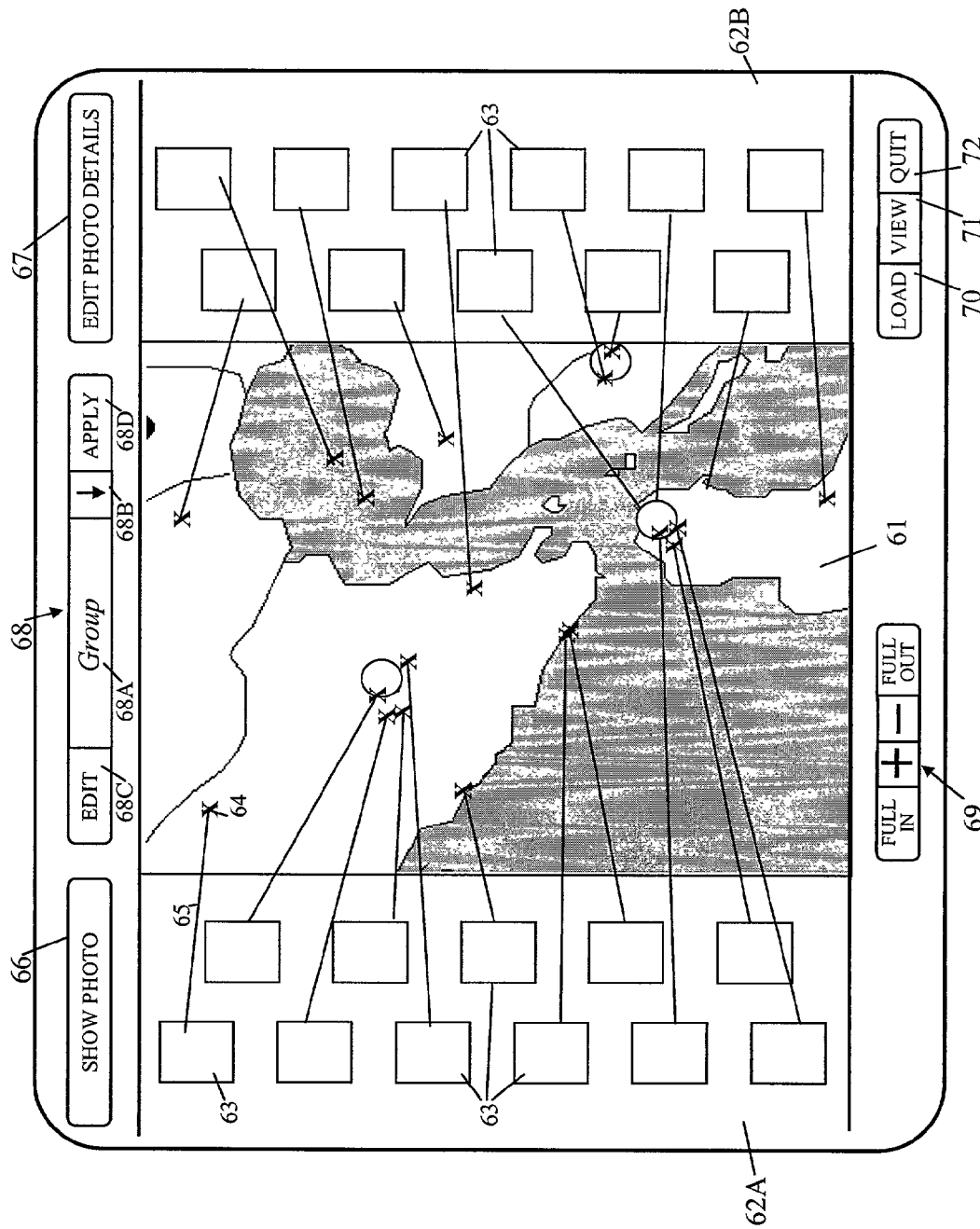
FIG. 6 shows a typical display output during a "Catalogue" operating mode of the FIG. 3 system.

In the Catalogue Mode, the album program generates a display of the form shown in FIG. 6 comprising a central map area 61, left and right margin areas 62A, 62B and upper and lower control bars. The map displayed in map area 61 is sufficient to encompass the locations registered for the newly loaded batch of photos. A thumbnail 63 of each new photo is shown in one or other of the margin areas 62A,B and a lead line 65 connects each thumbnail 63 to a corresponding marker 64 showing on the map the location where the photo was taken. The use of margins to show the thumbnails and lead lines to indicate the corresponding map locations is preferred as being less cluttered than trying to place the thumbnails directly in the correct locations on the map.

The upper control bar comprises three controls 66, 67, 68 that provide access to the following functionality, generally in respect of a pre-selected photo (this pre-selection being effected by clicking on the corresponding thumbnail):

Show Photo Control 66—this displays the photo corresponding to a selected thumbnail 63, with return to the Catalogue map being effected by a mouse click;

Edit Photo Details Control 67—this displays the record details 56 of a selected thumbnail and enables editing of these details;

Group Control 68—this control permits groups to be created, and a photo to be assigned to one or more groups (the photo ID being added into the group record 57).

The group control comprises a drop-down box 68A operated by control element 68B, the box normally displaying a currently selected group, if any. The user may cause the box to drop down (by clicking on control element 68B) to show a list of available groups from which the user can select one, this list also including an option to create a new group. Selecting this latter option takes the user to a creation screen where the user enters details of the new group. The details of a currently selected group can also be brought up for editing by operating (clicking on) control element 68C. To assign a photo to the current group, the corresponding thumbnail is selected and then the "Apply" control element 68D is operated. Preferably, double clicking the "Apply" control gives the mouse cursor the "Apply" power so that any thumbnail selected using the cursor is assigned to the current group (clicking on the Apply element again removes this power).

By way of example, a user may decide to create a group for photos taken on a particular holiday or a group for all photos related to a current or past abode. The group icon can be selected from a set of available icons or created by the user. Thus a current-abode group may have a house icon as its group icon whilst a holiday in London may be represented by a Tower Bridge icon.

The lower control bar includes a zoom control 69 that enables a user to zoom in or out around a particular point on the displayed map. More particularly, to zoom in on a target point, the "+" element of control 69 is selected, the display cursor placed on the target point and clicked. The "+" and "−" elements effect stepped, progressive, zooming; in contrast, the "Full In" element goes straight to closest zoom on a target point whilst "Full Out" returns to the original map display encompassing all of the newly loaded photos.

Controls 70, 71 and 72 respectively enable a user to change to the Load Mode, change to the Map View Mode, and Quit the program.

The album program is preferably operative to accept photos for which there is no meta data, including no location data. In this case, the corresponding meta data record initially only contains the album-generated data (Photo ID, accession data), and the Catalogue Mode is arranged to represent these photos but without lead line or location marker until such a time as the user enters location data into the location field of the photo record 56 either directly or by a facility for adding this data by pointing to a location on the map display.

Figure 7:
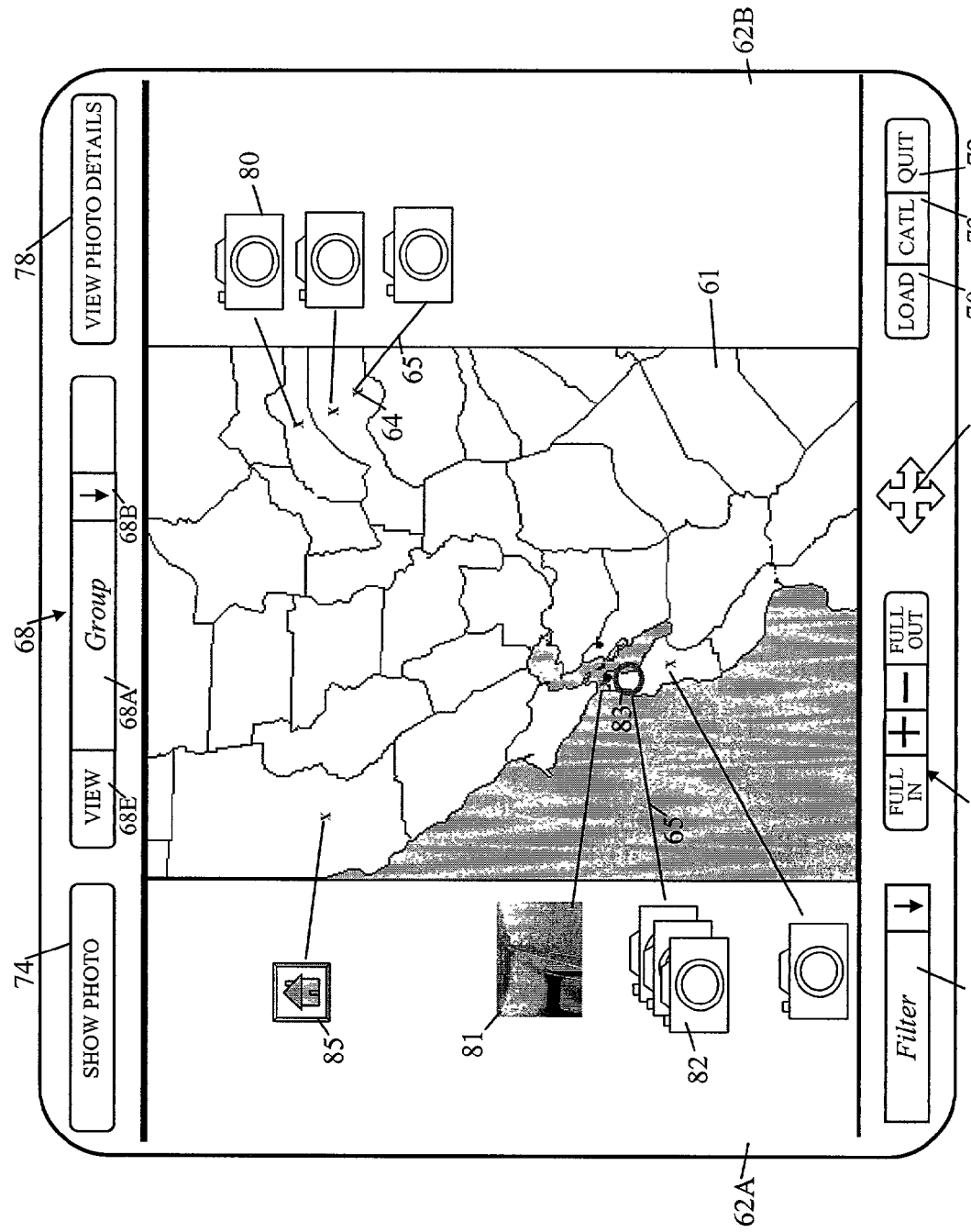
FIG. 7 shows a typical display output during a "Map View" operating mode of the FIG. 3 system.

Once a user has finished editing the photo meta data and assigning the photos to groups, the user may decide to browse the album and accordingly operates the "View" control 71. FIG. 7 depicts a typical Map View Mode display; for ease of understanding, the same references have been used on corresponding elements appearing in the Catalogue Mode and Map View Mode.

The starting map displayed in the Map View Mode is, for example, a world map or a map encompassing the locations of all the photos recorded in the album; alternatively, the map displayed could be the same map as being used in the Catalogue Mode before transiting to the Map View Mode. Initially, all photos relevant to the starting map will be represented either as thumbnails 81, individual photo icons 80, group icons (see current-abode group icon 85), or concentration icons (see icon 82). A concentration icon represents a number of photos that are not in a common group but were taken in the same general area and cannot be individually represented at the current map display resolution; the area concerned can be represented by a bounding circle 83. Where a concentration icon only encompasses photos that belong to a common group, the concentration icon is replaced by the group icon. Similarly, where a concentration icon encompasses at least a threshold number (e.g. 5) of photos that belong to a common group but other photos as well, then the group icon is shown alongside the concentration icon. If the threshold is crossed for several groups then each group icon will be shown (in determining whether the threshold is crossed, if a photo belongs to more than one group, it is counted towards the threshold for each group).

Zooming in and out is controlled by the same control 69 as already described for the catalogue Mode. If zooming in permits the photos of a concentration to be represented individually then this is done, the photos being collapsed back to a concentration icon and/or group icon on zooming back out. Scrolling the map display left, right, up or down is effected by scroll control 75 (or else scroll bars can be used).

To minimise clutter, a user may set an option (through a "customise menu", not shown) by which all photos of a group are initially represented by the corresponding group icon even if there is room to display the thumbnails of the group photos encompassed by the currently displayed map. In this case, the group icon is displayed with its location marker at the location of a user-specified one of the photos of the group (to implement this, a further group-control element "set leader" can be provided which, when activated, would store the photo ID of a currently-selected photo into an extra field of the group record of the current group, the location of this photo being the "location" of the group). To give access to the individual photos of a group, one or both of the following mechanisms can be used:

Single clicking on a group icon brings up a scrollable list of the photos in the group (preferably with date taken information and short title). Mouse rollover of a photo entry in the list causes the location marker of that photo to be displayed on the Map View (the photo's thumbnail can either be shown in the scrollable list all the time the list is displayed, or adjacent its location marker but only whilst the latter is displayed); moving the mouse cursor off the entry causes the location marker to disappear. Clicking the list entry causes the thumbnail to be inserted into a margin area with a lead line to a corresponding location marker on the map, this thumbnail being retained following closure of the group photo list. A variant of the above is to have display of the list accompanied by display of location markers for all the group photos encompassed by the current map-rollover of a list entry would then highlight the relevant location marker.

double clicking on a group icon unpacks the group and causes its photos to be represented as individual photos (or in concentrations).

Generally, whenever a particular photo is selected (for example, by clicking on it) the name of the related group (if any) is displayed in the group control element 68A—if a photo belongs to more than one group, these groups are viewable by opening up the dropdown box using control 68B. The details of the selected photo can then be viewed (but not edited) by operating control 78 or the photo viewed by operating Show Photo control 74 which causes the mode to switch to the Photo Show Mode. The details of the current group, if any, can be viewed by operating the view group control 68E.

Filter control 76 enables a user to select which photos are to be represented on the map display. Selection criteria can, for example, include one or more of the following:

Date range of when the photo was taken;
  User ID
  Camera ID
  Group name
  Batch ID
  Accession date
  Key word in short title/description/semantic location.

Access to a particular's user's photos can be password protected

If the user wishes to edit the details of a photo or group, the user must select the relevant photo and return to the Catalogue Mode; the map and photos displayed in the Catalogue will be those of the same batch as the selected photo.

Figure 8:
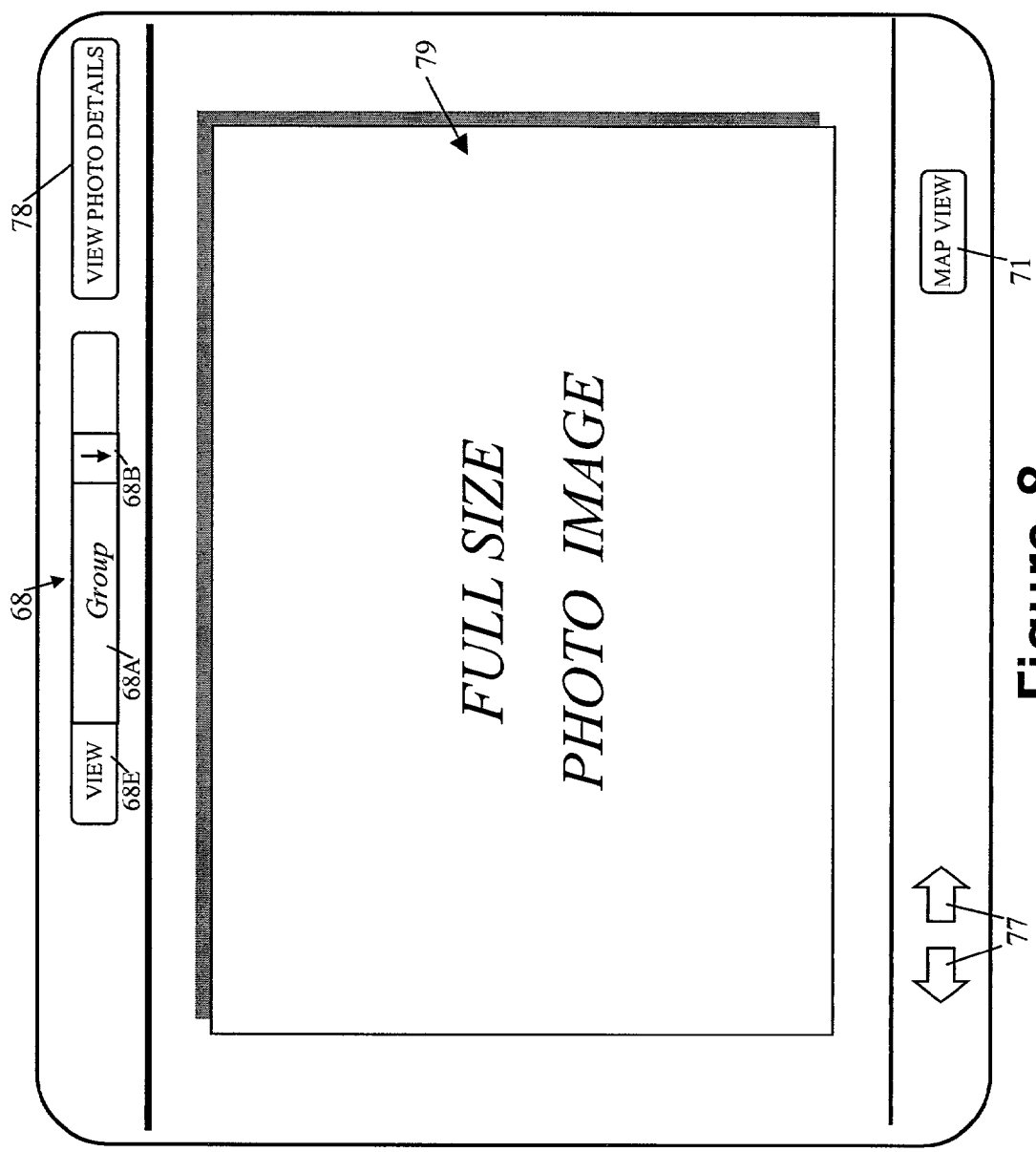
FIG. 8 shows a typical display output during a "Photo Show" operating mode of the FIG. 3 system.

FIG. 8 shows the Photo View Mode display brought up by clicking the Show Photo control 74 in the Map View Mode when a photo is selected. A full size image 79 of the photo is displayed and the user can view the photo and group details using the controls 67 and 68 respectively. Furthermore, a control 77 permits the user to view related photos in the same group (if photo is in more than one group, this will be the group appearing at the top of the dropdown box 68A, a different group being selectable by dropping down the group list); the group photos are accessed, for example, in date/time of taking order. If a photo is not associated with a group, then the album program permits photos of the same batch to be viewed, ordered by number.

The provision of suitable program code for implementing the above-described event-driven functionality is within the competence of persons skilled in the art.

A similar map-based album to that described above can also be used to classify and access other types of recording such as sound recordings, video recordings etc. Where the data is non-visual, the thumbnails and full-sized photo image representations of the above-described electronic photo album will be replaced by the corresponding representations for the recording concerned.

Uniting Location and Recording Data—at the Time of Generation

Of course, the vast majority of current cameras are not provided with location determining means. Nevertheless the foregoing map-based album can still be built up provided the user can activate a location determining device whilst located at the place a recording is being/has been/is about to be, made. In the near future, many location-determining devices (such as GPS devices) will be widely deployed; potentially more significantly, location services will become widely available to users of mobile phones (see the Annex to this specification which describes the mobile radio infrastructure and the provision of location-based services using such an infrastructure).

Thus it will become relatively easy for someone taking a photo to find out their location using their mobile phone. However what is additionally needed is some way of uniting this location information with the photographs.

Figure 9:
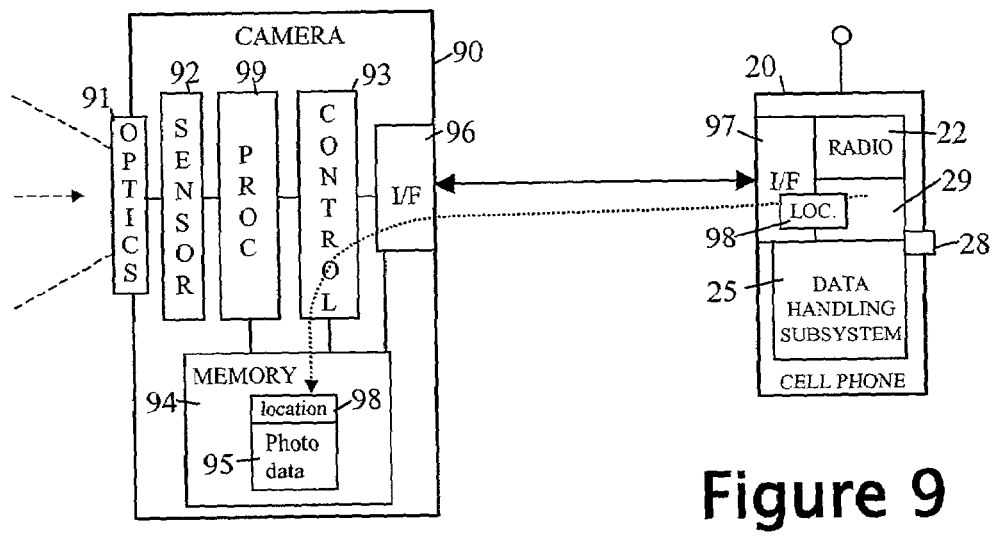
FIG. 9 is a diagram illustrating the transfer of location data from a cell phone to a digital camera.

One way of doing this is illustrated in FIG. 9 where a digital camera 90 is provided with a communications link to receive location data from a mobile entity 20 (here shown as a mobile phone, by way of example). More particularly, camera 90 comprises optics 91, sensor array 92, image processing block 99, control block 93, memory 94 for storing photo image data 95, and a communications interface 96. Cell phone 20 comprises, as well as its radio subsystem 22, a data handling subsystem 23, and communications interface 97. Interfaces 96 and 97 are compatible, enabling the camera 90 and cell phone 20 to inter-communicate; interfaces 96 and 97 are, for example, suitable for establishing an infrared or short-range radio link between the camera and cell phone.

Cell phone 20 also includes location-discovery means 29 by which the cell phone can ascertain its location, this location discovery being effected when control 28 (hard or soft button) is operated by the user. The location discovery means is, for example, a program run by the data handling subsystem for requesting location information from a location server of the mobile radio infrastructure; however, the location discovery means could alternatively be a GPS system built into the cell phone. Whatever form the location discovery means takes, when button 28 is operated, location data 98 is generated and is available in the phone for transfer to the camera 90.

Figure 10:
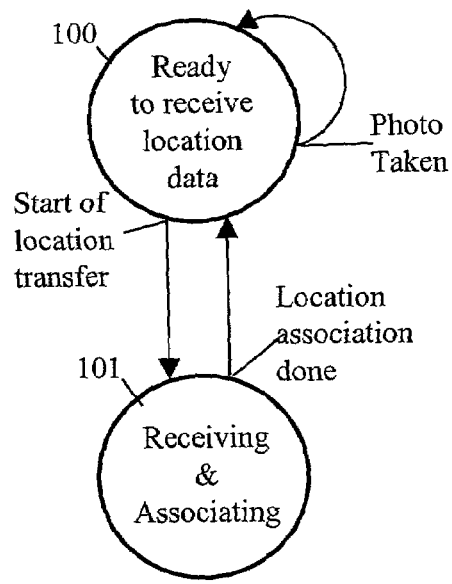
FIG. 10 is a state diagram for the location-data transfer process of FIG. 6.

The data handling subsystem runs a transfer program for transferring the location data over a link establish between the interfaces 96, 97. The control block 93 of the camera is operative to receive this location data and associate it with the last-taken photo. FIG. 10 shows a top-level state diagram of how this process is managed by association functionality of control block 93. Normally the association functionality resides in a state 100 in which it is ready to receive location data through interface 96; whilst in this state, the camera can be used to take photographs and the association functionality remains in state 101. However, upon location data being passed from cell phone, the association functionality transits to state 101 in which the camera is blocked from taking a photograph. In state 101, the association functionality of control block 93 receives the location data and associates it with the last taken photo. Once this is done (and it generally will happen very rapidly) the association functionality returns to state 100.

Of course, it would also be possible to have the taking of the photo by camera 90 trigger the location discovery by the cell phone followed by transfer to the camera.

Figure 11:
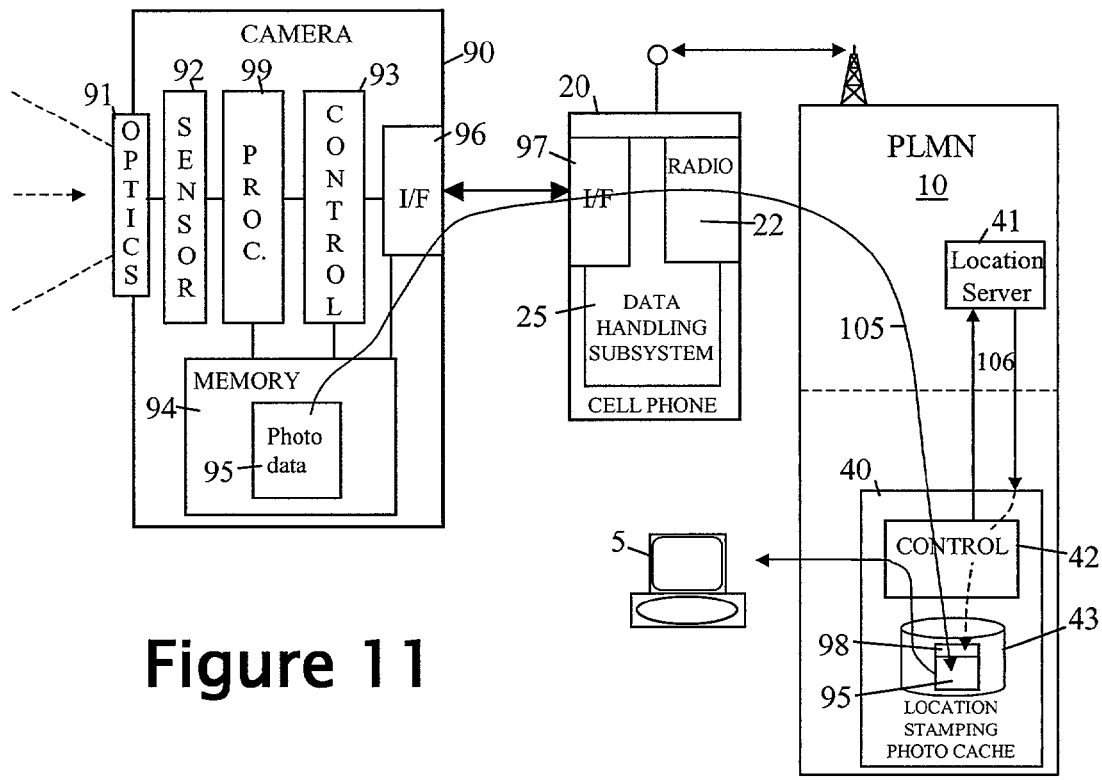
FIG. 11 is a diagram illustrating the transfer of camera image data via a cell phone and a PLMN to a PC running the FIG. 3 album program, the image data being location stamped with the cell phone location during transfer.

Another way of uniting a digital photo and location data is illustrated in FIG. 11 and involves uploading the photo image data 95 through the cell phone (via a link established between camera 90 and cell phone 20 through interfaces 96 and 97), to a network store 43 of a service system 40 (arrow 105 represents this transfer). The service system 40 resides either in the mobile infrastructure or is accessible via the latter over a data-capable bearer service. En route to the store, or upon loading into the store, location information 98 on the mobile phone is requested and associated with the photo image data 95; in the first case, the location data is obtained by the cell phone and associated with the image data as the image data is being transferred to the store 43 whilst in the second case, a control function 42 of the store is operative to request the location data 98 from location 41 immediately upon the image data being received by service system 40. Of course, this method will generally need to be effected for each photo immediately it is taken since otherwise the location of the cell phone may not correspond to the location where the photo was taken.

The foregoing methods of associating separately generated image and location data at around the time of generation can equally be applied to other types of recording.

Uniting Location and Recording Data—Subsequent to when Generated

In many cases, it will not be possible, for whatever reason, to link the camera 90 with a cell phone or other available location discovery means (such as a stand-alone GPS device). For these cases, a location log can be created for subsequent correlation with the photos being taken. More particularly, as the camera is used to take a number of photographs, the photographs as items are distinguished from each other by an implicit (e.g. sequence position) or explicit location-independent reference associated with each;

in association with taking each of at least some of said photographs, a mobile device that is separate from the camera and is capable of effecting or triggering location discovery of its position, is used to generate location data indicative of the location at which the photograph was taken, this location data being stored together with an index matching the reference associated with the corresponding photograph;

subsequently, the location data is united with the corresponding photographs by a correlation process using said references and indexes.

The mobile device is, for example, a cellular-radio-based mobile device (phone or e.g. a PDA with mobile radio capability) capable of effecting location discovery such as by requesting location data from a location server; the mobile device may take other forms such as a standalone GPS device.

References can simply be position-in-sequence of photographs (in which case the corresponding indexes are similar ordering data). Alternatively, the references can be timestamps—in this case, the indexes could be timestamps also (or, again, ordering data since timestamps are also this).

The photos can be traditional (chemical) snaps and the uniting is done by printing labels with the location data, these labels then being stuck on the back of the snaps (preferably this location data takes the form of a map showing the location where the photo was taken)—in this case, the labels are numbered to correspond to photo numbers.

Preferably, however, the photos are digital (or digitised) and the uniting of the photos with the location information is done in a PC or other computing device as part of the album program. Processes for effecting this uniting will be described hereinafter.

Figure 12:
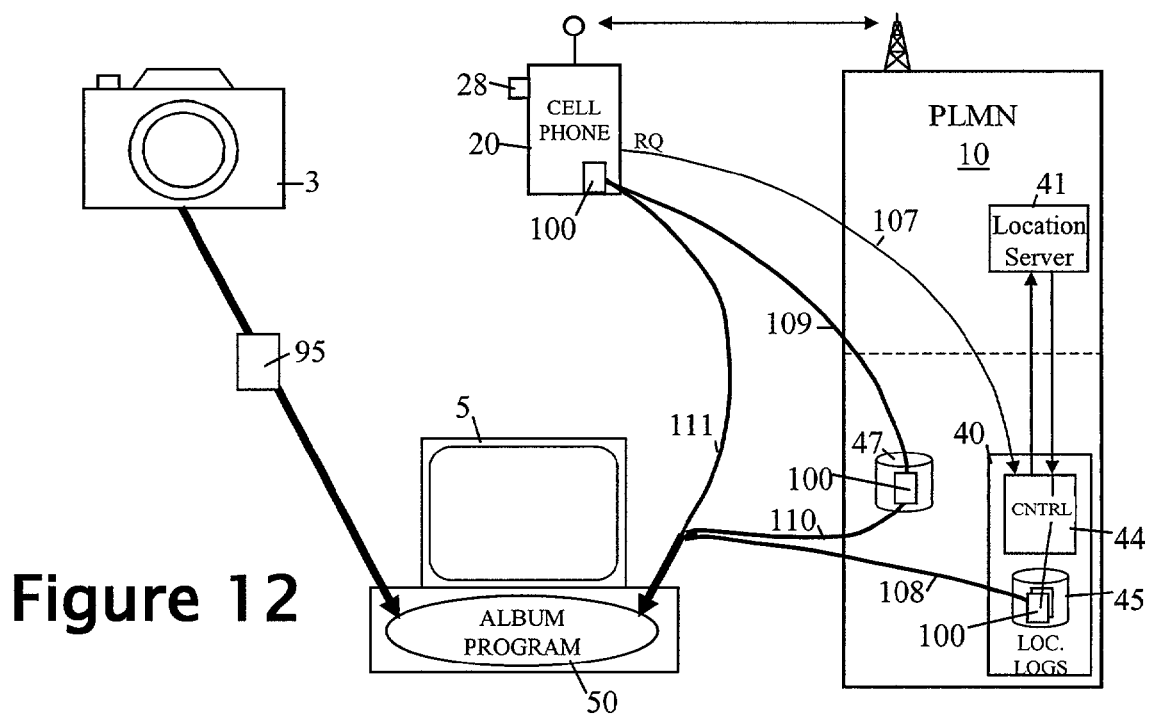
FIG. 12 is a diagram showing the independent transfer of image data and location data to a PC running the FIG. 3 album program.

With regard to how the location data is transferred to the same computing device as the photo image data, a number of possibilities exist and FIG. 12 illustrates three such possibilities in the case where the mobile device is a cell phone 20. More particularly, FIG. 12 shows a camera 3 and cell phone device 20 both possessed by the same user. The cell phone 20 communicates with mobile radio infrastructure 10. Whenever a user takes a photo he/she operates a button 28 of the cell phone to cause the cell phone to trigger a determination of its location either by itself or through location server 41 of the PLMN 10. A log of location data on each photo taken is built up. In due course the user transfers the image data 95 from the camera 3 to computer 5 running the album program 50. As regards transfer of the location log to the computer, the following three possibilities are illustrated:

a)—location data for each photo is accumulated in a location log 100 stored in the cell phone and subsequently transferred (see arrow 111) directly to the computer 5 over a wire link, infrared link or short-range radio link.

b)—location data for each photo is accumulated in a location log 100 stored in the cell phone and this log is subsequently transferred (arrow 109) via a data-capable bearer service of the PLMN 10 to a store 47 (in the PLMN or a connected network, such as the Internet). The location log is later retrieved by computer 5 from store 47 (see arrow 110).

c)—Operation of cell-phone button 28 sends a request (arrow 107) to a log-service controller 44 of a log server system 40 to obtain the location of cell phone from location server 41 and store it in a log 100 held in store 45 of the service system, the identity of the log to be used being included in the request. The log 100 is subsequently retrieved by computer 5 from store 45 (see arrow 108).

The same processes as described above can being effected for other types of recordings, the location data being separately determined and subsequently re-united with the recording concerned. In the case of a sound recording done, for example, on a tape recorder, the location data could even be provided by a digital camera equipped with GPS.

It may be noted that giving a mobile phone the ability to store a location log (either in the phone itself or in the mobile infrastructure or in a connected network) is itself a useful feature. Thus whilst many location-based services simply require a one-off provision of location data or continually monitor location, the ability for a user to selectively trigger location determination for storing the resultant data to a log has value in its own right—for example, a user may wish to store the location of places visited whilst out walking or, as described above may want to log the locations of photos taken. Since the user may also want to use other location-based services at the same time, the user must be able to select when location information is to be logged. Further, since the user may want to log location information about different topics, the mobile phone (or other location-determination-triggering device) preferably permits a user to set up more than one log at a time and to select to which log a particular item of location data is to be stored.

Figure 13:
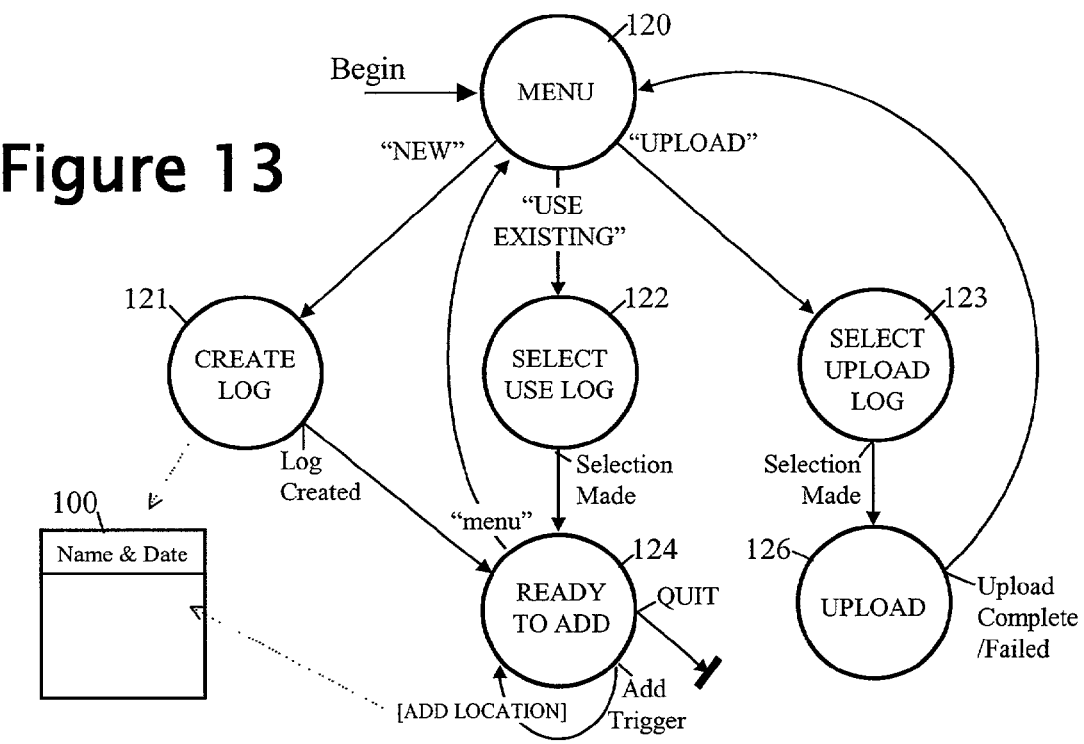
FIG. 13 is a state diagram of a location log function of a mobile entity equipped with location discovery means.

FIG. 13 shows a controlling state machine for a location-log application capable of managing multiple location logs, the application running, for example, on a data handling subsystem of a mobile entity (such as a cell phone) that has means for discovering its location either directly or from a location server. Selection of the application sets the application into a menu state 120 that presents the user with the choices of creating a new log, using an existing log, or uploading an existing log (for example, to network store 47 or computer 5 in the FIG. 12 arrangement). If the user chooses to create a new log, state 121 is entered in which the user is asked to specify certain details about the log (in particular, its name); in due course new log 100 is created and the log application automatically transits to state 124 in which location can be added to the log. This same state 124 is also reached when the user chooses the 'use existing log' option from the opening menu, the log application first entering state 122 in which the user selects from a list of existing logs, the log to be used; selection of the log to be used automatically moves the log application to state 124.

When in state 124, the log application responds to an external trigger to add a location to the currently-selected log, by obtaining the current location of the mobile entity and logging it to the currently selected log together with a timestamp. The log application continues in state 124 with the same log selected until the user either quits the application or chooses to return to the menu state 120. The external trigger for adding a location can either be user input (e.g. by operating a hard or soft button) or a command received from another device. Because the log application initiates location-data requests to the location providing means of the mobile entity, it is straightforward to arrange that the log application is only passed relevant location data (that is, location data it has requested) and therefore it will not erroneously log location data provided for other applications.

If the user chooses the upload option from the menu state, the log application transits first to a selection state 123 in which the user selects the log to be uploaded and then to an upload state 125. In the upload state the log application oversees the transfer of the selected location log. Upon completion of transfer, the log application returns to the menu state 120.

Recording a location independently of taking a photo still has relevance to photo creation. For example, the situation may arise that a user would like to take a photograph of a place or item but has run out of film/on-camera storage, or is present at a time when it is not possible to take a photograph (at night, in heavy rain or mist, etc). In such cases, the user can record their location in their photo location log and subsequently retrieve from the Web (or other photo archive) a photograph similar to that the user wanted to take.

Where a camera is provided with location discovery means 29 for location stamping photos (see camera 90 in FIG. 17), the control means 93 of the camera, when activated by user operation of input control 28, can be arranged to enable additional location information 98 to be stored in memory 94 without the need to actually record image data 95; this permits the camera to log the location of desired but untaken photos. The location data that is recorded independently of taking a photo ('independent location data'), is preferably stored in sequence with location data associated with photos actually taken ('recorded-photo location data'); thus, for example, the independent location data can be treated as a normal 'image+location' data item with zero image data (see item 175). Alternatively, the independent location data can be stored in its own log separate from the recorded-photo location data.

Matching Separately-Generated Image and Location Data

Figure 14:
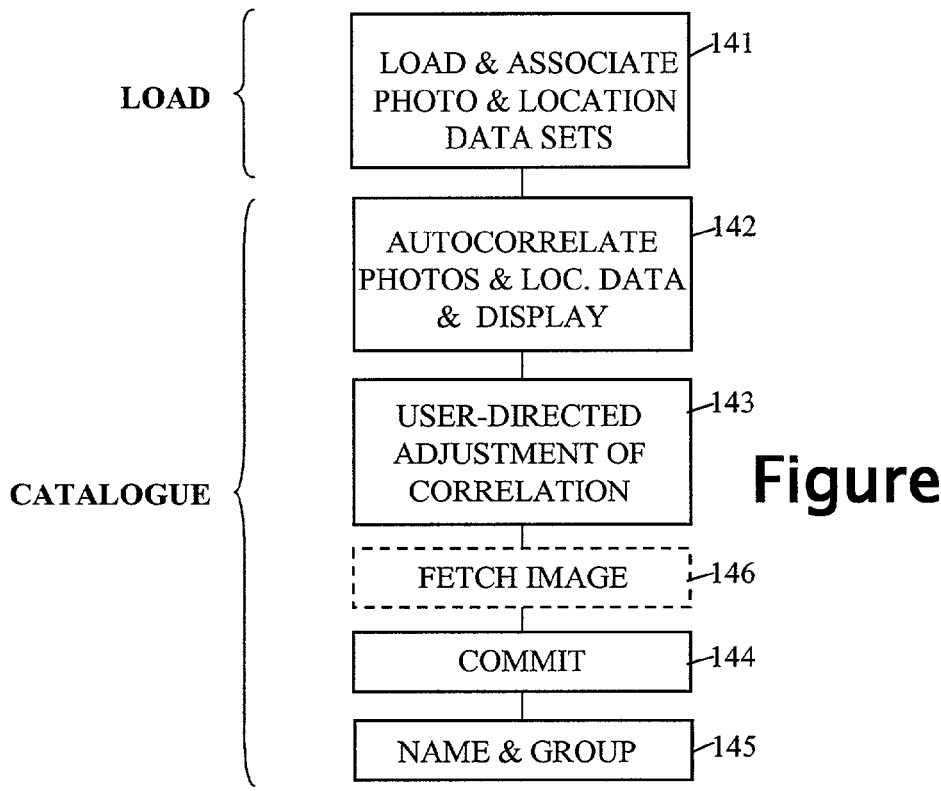
FIG. 14 is a diagram illustrating the main steps of the Load and Catalogue operating modes of the FIG. 3 album program in the case of image data and location data being separately provided.

In order to accommodate the separate provision of image data and location data, the album program 50 described above with reference to FIGS. 3-8 is adapted as depicted in FIG. 14. More particularly, the Load Mode is adapted to independently load the image data and the location data (block 141), the data loaded from the camera being handled as before but without the location data field being filled in on each photo meta-data record 56 whilst the location data is temporarily stored in a log identified as related to the batch of photos concerned.

The Catalogue Mode is now split into two operating phases in the first of which the image data and location data are correlated (blocks 142 to 144), the second phase being the grouping and details-editing stage that formed the original Catalogue Mode. With regard to the first phase, this involves an automatic correlation process (block 142), followed by a user-directed correlation adjustment process (block 143); the resultant correlation of image and location data is then committed for storage by the user (block 144) at which time the location data field of each photo meta-data record is updated and the separate location log deleted.

Figure 17:
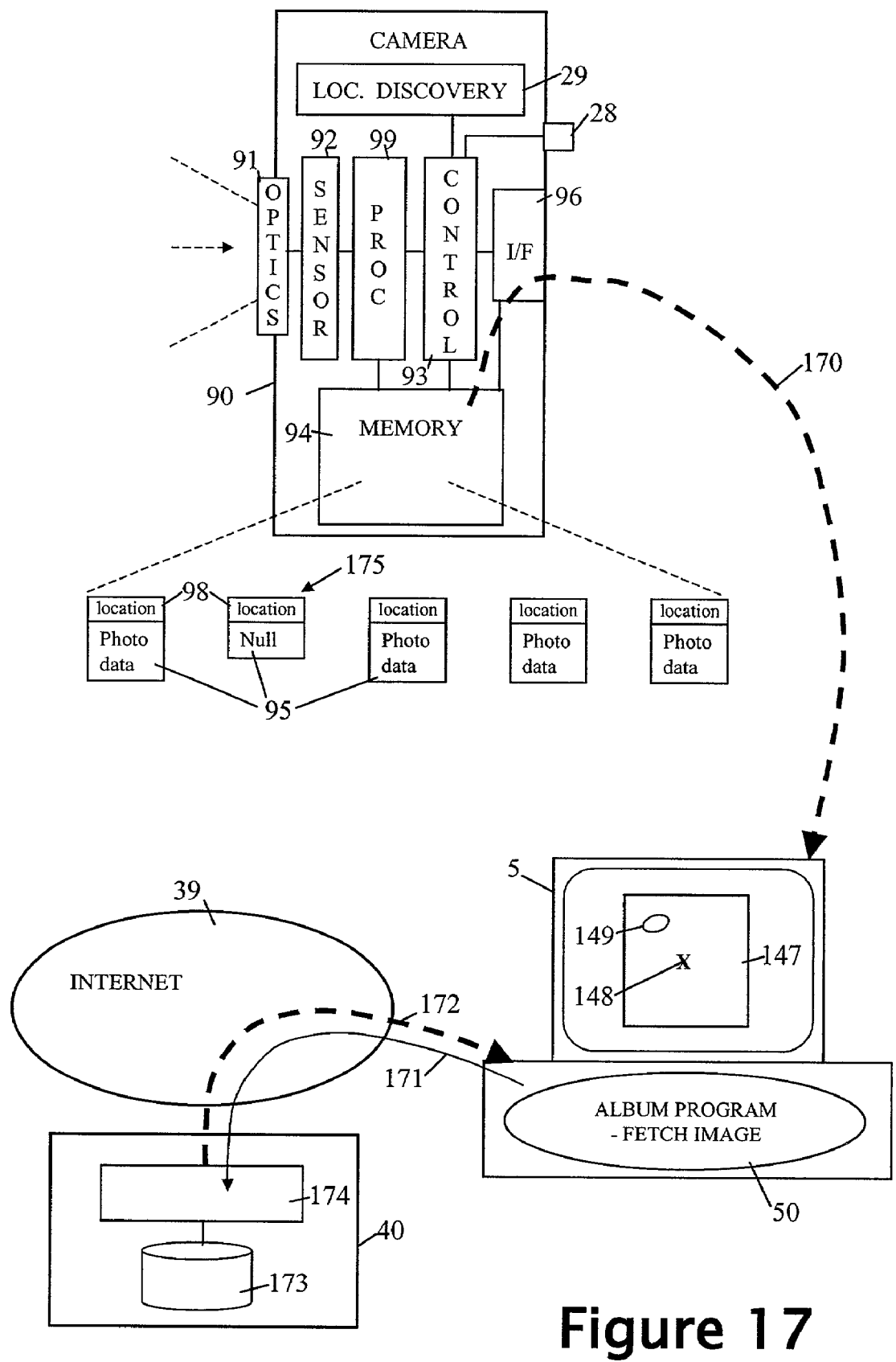
FIG. 17 is a diagram showing the recording of the location of desired but not taken photos and the subsequent retrieval of matching images.

In the event that the location log includes desired-but-not-taken photo location data, there is an additional process (see dotted block 146) between blocks 143 and 144 in which the user is given the option of fetching (or initiating an automatic fetch of) photo image data from the Internet to match the location concerned. This process is depicted in FIG. 17 where desired image data is supplied (arrow 172) by a specialised service 174 set up to provide such image data in response to requests (arrow 171). Preferably, where automatic fetching is implemented, more than one photograph will be retrieved on the basis of location, the user then being presented with a choice of third-party photos to add to the user's own photo album. As a preliminary step to fetching one or more photographs, the user can be presented with a detailed map 147 of the area around the desired-but-not-taken photo location 148—the user can then specify approximately what subject/view 149 they are interested in (the location data by itself not indicating, for example, the direction in which the user was looking when the location was logged or whether the user was interested in a near field object or a far view). The user can specify the view of interest by, for example, clicking a target point or defining a target area on the map display. The information derived from the user is passed with the request for retrieving relevant photos.

The user may, in fact, decide to defer fetching image data until later in which case the act of committing the existing correlation in block 144 also causes the creation of a photo meta-data record for the desired-but-not-taken photo and such ghost photos will be subsequently represented in the displays of FIGS. 6 and 7 by "?" icons; clicking on such an icon can be arranged to initiate, at least in the Catalogue Mode, the process for fetching an appropriate image.

Figure 15:
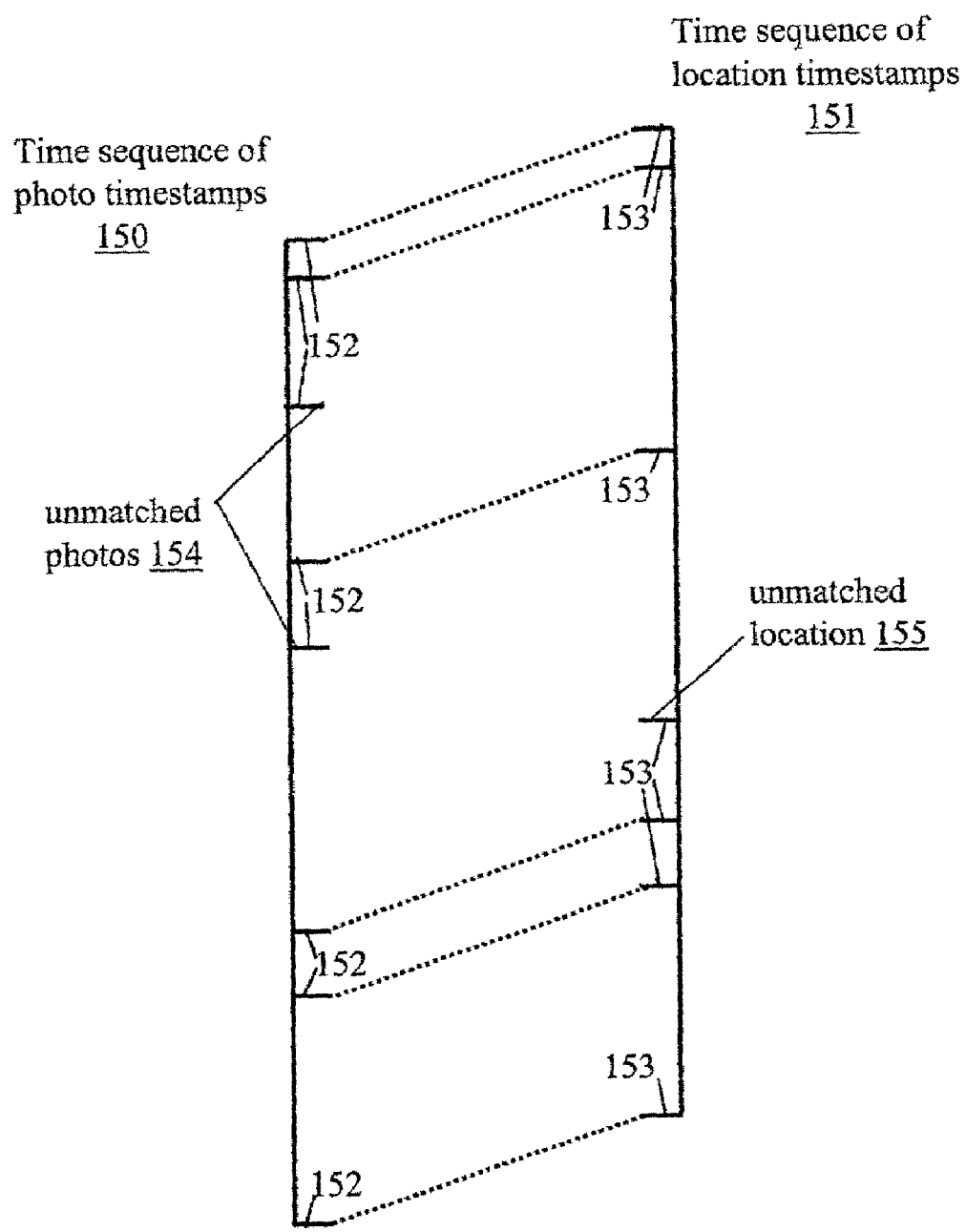
FIG. 15 is a diagram illustrating the matching of location data to images by matching patterns of timestamps.

Considering now the automatic matching process of block 142, one efficient way of doing this is by time-stamping digital photos in the camera and time-stamping the location data that is separately created at the same time (approximately) in a different device. Because different clocks are used for the two time stamps, absolute time is not reliable for matching the location data with the photo image data. However, the pattern of timestamps (i.e. time-interval related data) can be used to perform a match. This remains true even when there are additional entries in either the batch of photos or the location log that have no counterpart in the other collection. FIG. 15 shows an example in which a timestamp sequence 150 of a batch of eight photos is to be matched against a timestamp sequencer 51 of a location log with seven entries. The individual photo timestamps are represented by marks 152 whilst the individual location timestamps are represented by marks 151. As can be seen, it is a relatively easy matter to match up the two patterns of timestamps notwithstanding that there are two time-stamped photos 154 for which there are no corresponding location entries and one time-stamped location 155 for which there is no corresponding photo (this may be because the location corresponds to a desired-but-not-taken photo location). Appropriate pattern matching techniques for effecting the automatic matching of the timestamp sequences 150, 151 are well known to persons skilled in the art.

The same approach could be used for matching other types of auxiliary data (and not just location data—for example sound clip data) with photos; again, the matching process can be used with any type of recording, not just photos.

As already noted, matching can also be done on the basis of sequence number and this can be done even where the photos are only physical items—in this case, the location data is printed out on numbered self-adhesive labels than can be stuck to the back of the corresponding photos.

Returning to matching location data and photos in the album program 150, whilst using sequence numbers, for example, seems an easy way to match up a set of photos with a corresponding set of location-data items, it is quite likely that there will be additions/omissions in one set as compared to the other. As a result the match between the sets will be imperfect. Mismatching may also arise where other correlation keys (that is, not sequence position) are used. However, it may generally be assumed that the ordering of entries is the same for both sets To correct the match up, a user must intervene and manually correct erroneous associations between entries in the two sets—this being the purpose of the process represented by block 143 in FIG. 14. This adjustment process can conveniently be done by generating a Catalogue Mode display such as shown in FIG. 6 on the basis of the matching achieved after running the automatic match process of block 142 (where implemented), or else simply by pairing off photos with location-data items in sequence order until one of the sets (photos; location-data items) runs out. In the resultant display, lead lines 65 connect photo thumbnails 63 with location markers 64 on the map. To correct an erroneous association, a user drags the map end of the relevant lead line 65 to the correct location marker 64 on the map—or drags the photo end of the lead line to the correct photo (or simply clicks on the matching entries in turn).

Figure 16A:
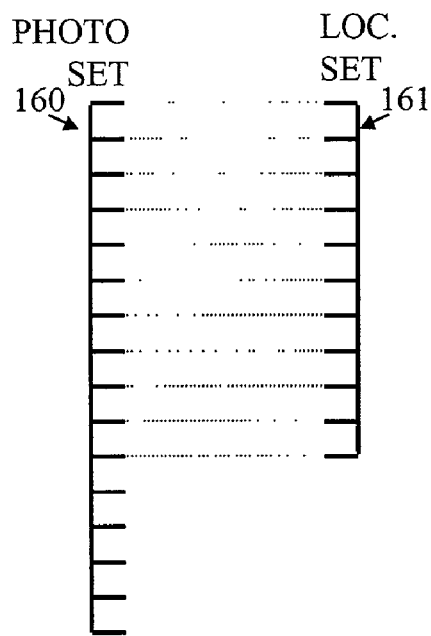
FIGS. 16A-D show a user-effected correction of mismatched sequences of images and location data.

To minimize the number of times this needs to be done, use is made of the consistency of the ordering of both sets—in particular, the associations of photos and location data for entries later in the orderings than a just-corrected association, are re-matched taking into account the corrected association. If these entries include an already corrected association, this latter is not disturbed. This feature is illustrated in FIGS. 16A-D where:

FIG. 16A—shows an initial matching of a set of photos 160 with a set of location-data items 161, the photos and location-data-items being paired off until the location-data item set is exhausted.

Figure 16B:
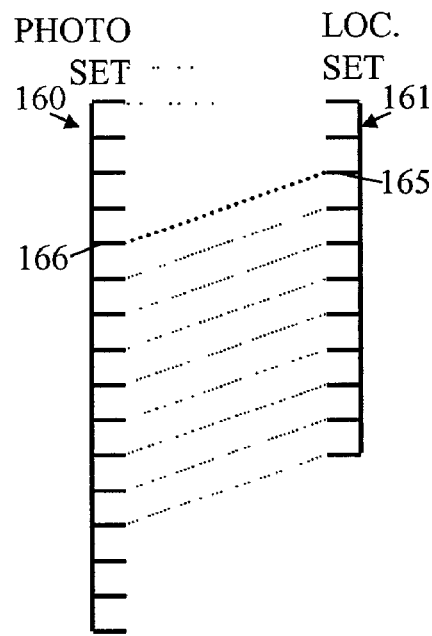
Figure 16C:
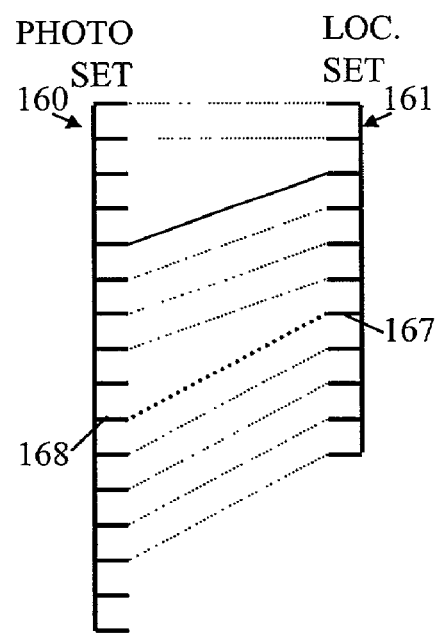

FIG. 16B—user determines that the third location-data item 165 is actually associated with the fifth photo 166 and corrects the association accordingly; this results in a re-pairing of all location-data items subsequent to the item 165 with photos subsequent to photo 166 as illustrated FIG. 16C—similarly, user determines that the seventh location-data item 167 is actually associated with the tenth photo 166 and corrects the association accordingly; this results in a re-pairing of all location-data items subsequent to the item 167 with photos subsequent to photo 168 as illustrated.

Figure 16D:
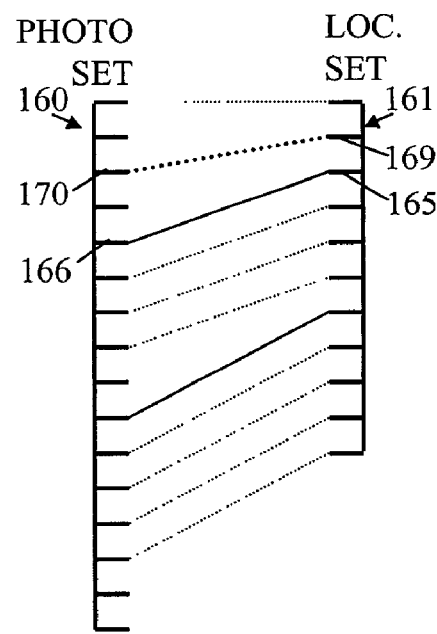

FIG. 16D—user now decides that the second location-data item 169 should be associated with the third photo 170 and corrects the association accordingly; no consequential downstream adjustments are made since the next association is one previously established by the user (between location data item 165 and photo 166).

It will be appreciated that the match-adjustment process described above with reference to FIG. 16 can be used to associate location data with other types of recordings.

Annex A—Mobile Radio Infrastructure; Location Determination

This Annex forms an integral part of the specification.

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

Figure 1:
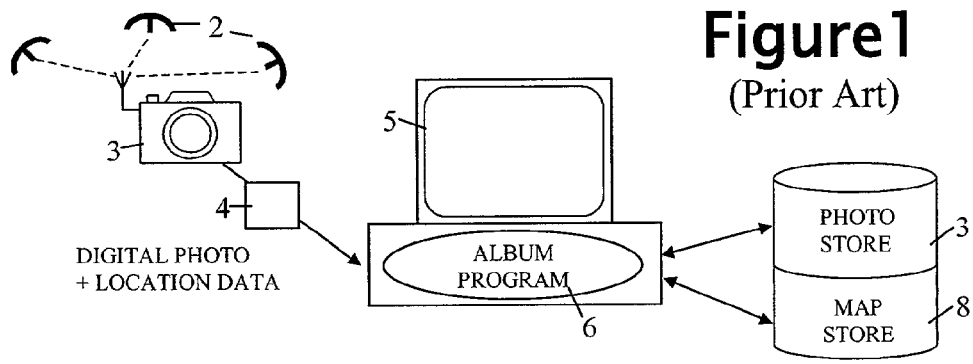
FIG. 1 is a diagram of a known map-based photographic album system.
Figure 2:
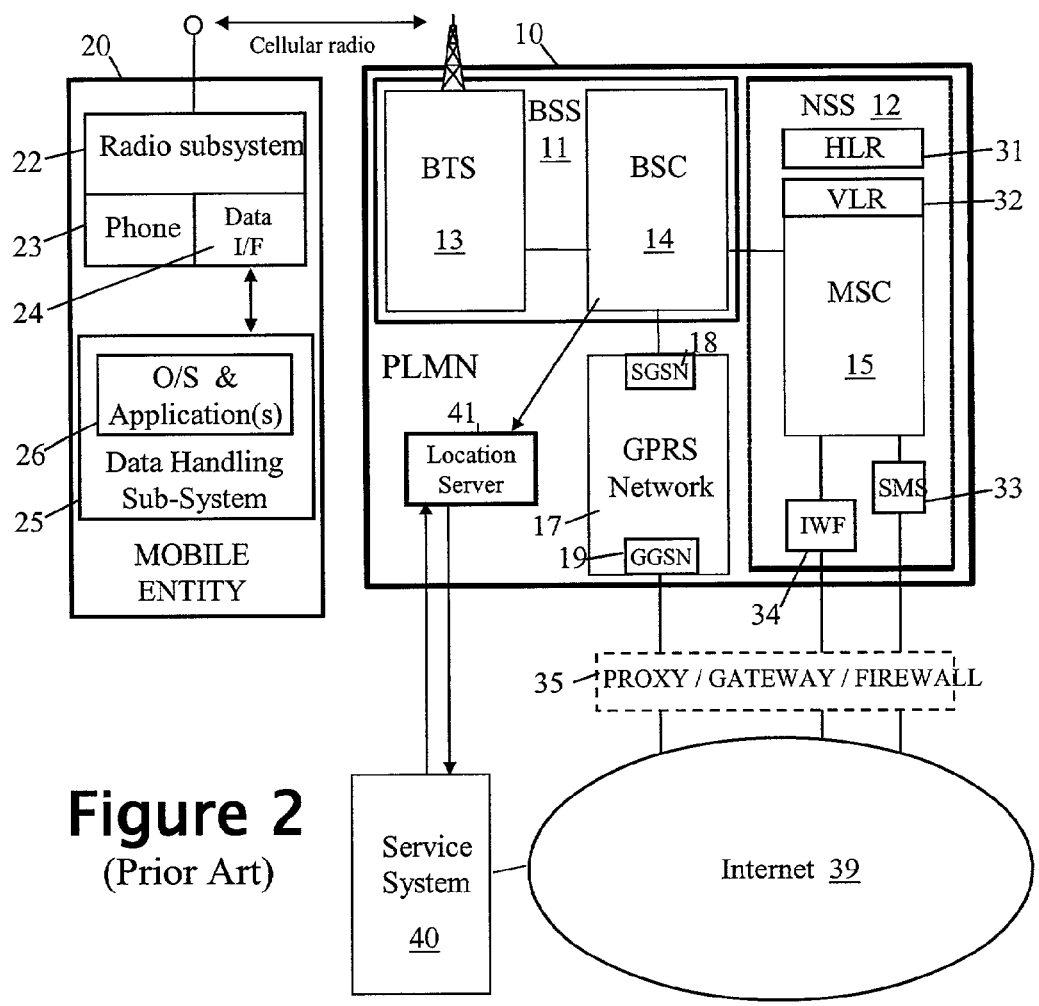
FIG. 2 is a diagram of a known communications infrastructure usable for transferring voice and data to/from a mobile entity.

By way of example, FIG. 2 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an Inter-Working Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 2, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22-24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

As regards the service provided by the service system 40, this can be a location-aware service (also known as a "location-based" or "location-dependent" service), being a service that takes account of the current location of the mobile entity 20. The most basic form of this service is the emergency location service whereby a user in trouble can press a panic button on their mobile phone to send an emergency request-for-assistance message with their location data appended. Another well known location-based service is the provision of traffic and route-guiding information to vehicle drivers based on their current position. A further known service is a "yellow pages" service where a user can find out about amenities (shops, restaurants, theatres, etc.) local to their current location.

Location-aware services all require user location as an input parameter. A number of methods already exist for determining the location of a mobile user as represented by an associated mobile equipment. In addition to location discovery systems based on GPS (Global Positioning System), there exist a number of other systems the most notable of which are those that rely on cellular radio infrastructures. More particularly, within a PLMN coverage area, it is possible to get a reasonably accurate fix on the location of a mobile entity by measuring timing and/or directional parameters between the mobile entity and multiple BTSs 13, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

FIG. 2 depicts the case of location determination being done in the network, for example, by making Timing Advance measurements for three BTSs 13 and using these measurements to derive location (this derivation typically being done in a unit associated with BSC 14). The resultant location data is passed to a location server 41 from where it can be made available to authorised services. Thus, when the mobile entity 20 wishes to invoke a location-aware service available on service system 40, it sends a request to service system 40 via a data-capable bearer service of the PLMN 10 and the internet 39; this request includes an authorisation token and the mobile entity ID (possible embedded in the token). The service system then uses the authorisation token to obtain the current location of the mobile entity 20G from the location server 41 (the location server 41 will probably not be holding current location data for the mobile entity 20 and will need to request the appropriate BSC to determine this data before returning it to the service system 40). The use of an authorisation token is unnecessary if the service has been prior authorised to the location service by the mobile entity. Of course, as an alternative to having the service obtain location data from the location server 41, the mobile entity could have requested its location from the location server and then included this information in the request to the location-aware service running on service system 40.

Whilst the above description has been given with reference to a PLMN based on GSM technology, it will be appreciated that many other cellular radio technologies exist and can typically provide the same type of functionality as described for the GSM PLMN 10.

The invention claimed is:

1. A method comprising:
recording, in association with taking a first image recording with a camera, first data indicative of a geographic location of said camera;
recording, in response to an activation of said camera, and separately from taking an image recording using said camera, second data indicative of a geographic location of said camera; and
retrieving, from a resource separate from said camera, a second image recording concerning said geographic location indicated by said second data, wherein said second image recording was taken by a device other than said camera.

2. A method according to claim 1, wherein both said first data and said second data are recorded in a recording arrangement that is separate from said camera.

3. A method according to claim 2, wherein said first data and said second data are recorded in a same sequence of data items.

4. A method according to claim 1, wherein said first data and said second data are recorded in said camera.

5. A method according to claim 4, wherein said first data and said second data are recorded in a same sequence of data items.

6. A method according to claim 1, wherein said retrieving comprises retrieving multiple image recordings, displaying said multiple image recordings, and enabling a user to choose at least one of said multiple image recordings for retention and association with said first image recording.

7. A method according to claim 1, wherein said retrieving comprises displaying a map of an area around said geographic location indicated by the second data and obtaining an input detailing a target subject, zone or point, and using said input to facilitate said retrieving.

8. A method according to claim 1,
wherein subsequent to taking said first image recording, a map display shows locations where said first image recording was taken,
wherein prior to said retrieving, an item is represented on said map display, and
wherein said item corresponds to said geographic location indicated by said second data.

9. A method according to claim 8, wherein when said map display is present, retrieval of an image recording corresponding to said item is initiated by clicking on a displayed graphic element associated with a displayed location corresponding to said item.

10. A method according to claim 1, wherein said retrieving comprises contacting an Internet service system operative to provide image recordings to registered users on the basis of location data supplied in a service request.

11. A method, comprising:
recording a first image using a camera;
recording, in response to an activation of said camera, but separately from taking an image recording using said camera, data indicative of a geographic location of said camera, said data being so recorded as to indicate an association with said first image; and
retrieving, based on said data, from a resource other than said camera, a second image concerning said geographic location, wherein said second image recording was taken by a device other than said camera.

* * * * *